US011451973B2

(12) United States Patent
Emani et al.

(10) Patent No.: US 11,451,973 B2
(45) Date of Patent: Sep. 20, 2022

(54) SIMULATING OPERATION OF A 5G WIRELESS TELECOMMUNICATION NETWORK

(71) Applicant: T-Mobile USA, Inc., Bellevue, WA (US)

(72) Inventors: Srinivasa Emani, Sammamish, WA (US); Srinivasa Chinimilli, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 71 days.

(21) Appl. No.: 17/030,190

(22) Filed: Sep. 23, 2020

(65) Prior Publication Data

US 2022/0095122 A1 Mar. 24, 2022

(51) Int. Cl.
*H04W 16/22* (2009.01)
*H04L 43/50* (2022.01)
(Continued)

(52) U.S. Cl.
CPC ............. *H04W 16/22* (2013.01); *H04L 41/22* (2013.01); *H04L 43/50* (2013.01); *H04W 24/08* (2013.01)

(58) Field of Classification Search
CPC ..... H04W 16/22; H04W 24/08; H04W 24/06; H04W 48/18; H04L 41/22; H04L 43/50;
(Continued)

(56) References Cited

U.S. PATENT DOCUMENTS 7,702,766 B2 4/2010 Weir et al.
7,738,388 B2 6/2010 Cheung et al.
(Continued)

FOREIGN PATENT DOCUMENTS

CN 101039246 A 9/2007
CN 109525679 A 3/2019
(Continued)

OTHER PUBLICATIONS

A. Poylisher et al., "Virtual Ad hoc Network testbeds for high fidelity testing of tactical network applications," MILCOM 2009—2009 IEEE Military Communications Conference, 2009, pp. 1-7, doi: 10.1109/MILCOM.2009.5379721. (Year: 2009).*

*Primary Examiner* — Glenton B Burgess
*Assistant Examiner* — Rachel J Hackenberg
(74) *Attorney, Agent, or Firm* — Perkins Coie LLP

(57) ABSTRACT

Introduced here is a system and method to simulate operation of a 5G wireless telecommunication network, prior to deploying a component of the network, to detect problems before the problems affect a large number of users. The system can provide a graphical user interface enabling a user to define a test including a test request and a criterion that a response to the test request needs to satisfy. The processor can create a virtual instance of the network including a virtual instance of a 5G NR node and a virtual instance of a second node. While the physical 5G wireless telecommunication network and the nodes include hardware and software, the virtual instances of the network and the nodes are software constructs simulating the behavior of the physical counterparts. Once the changes are released, the system can also be a monitoring tool to monitor performance of the network.

20 Claims, 18 Drawing Sheets

440
600
610
620
630

(51) Int. Cl.
*H04L 41/22* (2022.01)
*H04W 24/08* (2009.01)

(58) Field of Classification Search
CPC ... H04L 41/145; H04L 43/04; H04L 43/0847; H04L 43/0817; H04L 43/0811; H04L 43/0829; H04L 43/0852
See application file for complete search history.

(56) References Cited

U.S. PATENT DOCUMENTS

| | | | | |
|---|---|---|---|---|
| 8,107,382 | B2 | 1/2012 | Lin et al. | |
| 8,532,970 | B2 * | 9/2013 | White | H04L 41/145 703/13 |
| 9,076,013 | B1 | 7/2015 | Bailey et al. | |
| 9,418,567 | B1 | 8/2016 | Chen et al. | |
| 9,762,611 | B2 | 9/2017 | Wallace et al. | |
| 10,498,625 | B1 | 12/2019 | Mozealous et al. | |
| 2007/0280247 | A1 | 12/2007 | Mera et al. | |
| 2008/0005613 | A1 | 1/2008 | Marquardt et al. | |
| 2008/0298260 | A1 | 12/2008 | Cheung et al. | |
| 2011/0299409 | A1 | 12/2011 | Vobbilisetty et al. | |
| 2012/0017210 | A1 | 1/2012 | Huggins et al. | |
| 2013/0178211 | A1 | 7/2013 | Wang et al. | |
| 2017/0237773 | A1 | 8/2017 | Wallace et al. | |
| 2019/0140884 | A1 | 5/2019 | Liu et al. | |
| 2019/0173764 | A1 * | 6/2019 | Di Martino | H04L 41/24 |
| 2020/0220746 | A1 * | 7/2020 | Shribman | G06F 9/45558 |
| 2021/0099552 | A1 * | 4/2021 | Reynolds | H04W 88/08 |

FOREIGN PATENT DOCUMENTS

| | | | |
|---|---|---|---|
| EP | 1790142 | A1 | 5/2007 |
| EP | 1790142 | B1 | 11/2010 |
| EP | 2521976 | A2 | 11/2012 |
| EP | 2596610 | A1 | 5/2013 |
| EP | 2521976 | B1 | 4/2018 |
| EP | 3367612 | B1 | 5/2019 |
| JP | 2013516715 | A | 5/2013 |
| KR | 20050032805 | A | 4/2005 |
| KR | 20080105959 | A | 12/2008 |
| WO | 2007033542 | A1 | 3/2007 |
| WO | 2007040882 | A2 | 4/2007 |
| WO | 2018156065 | A1 | 8/2018 |
| WO | 2019135745 | A1 | 7/2019 |

* cited by examiner

| 5G Core | Network Function | 4G LTE Counterpart |
|---|---|---|
| AMF | Access and Mobility Management Function | MME |
| UDM | Unified Data Management | USD |
| CHF | Charging Function | OCS |
| SMF | Session Management Function | PGW-C |
| PCF | Policy Control Function | PCRF |
| UPF | User Plane Function | PGW-U |
| AF | Application Function | IMS |
| AUSF | Authentication Server Function | USD |
| N3IWF | Non-3GPP Access Interworking Function | ePDG |
| NEF | Network Exposure Function | SCEF |
| NSSF | Network Slice Selection Function | N/A |
| SMSF | Short message service Function | SMSC |
| SEPP | Security Edge Protection Proxy | N/A |
| NRF | Network Repository Function | N/A |
| LI | Lawful Intercept | CALEA |

SIMULATING OPERATION OF A 5G WIRELESS TELECOMMUNICATION NETWORK

BACKGROUND

A wireless telecommunications network is a group of nodes interconnected by links that are used to exchange messages between the nodes. The links can use a variety of technologies based on the methodologies of circuit switching, message switching, or packet switching, to pass messages and signals. The wireless telecommunication networks can contain billions of nodes. Given the complexity of the wireless telecommunication network, testing the performance of the network or determining how a change to the network will affect the performance of the network is difficult.

BRIEF DESCRIPTION OF THE DRAWINGS

FIG. 2 shows 5G core network nodes that can be simulated by the system.

FIGS. 6A-6B show a test results web page.

DETAILED DESCRIPTION

A processor can simulate operation of a 5G wireless telecommunication network ("5G network," or "network") including a 5G NR node. The processor can provide a graphical user interface enabling a user to define a test including a test request and a criterion that a response to the test request needs to satisfy. The processor can create a virtual instance of the 5G wireless telecommunication network including a virtual instance of the 5G NR node and a virtual instance of a second node. While the physical 5G wireless telecommunication network and its nodes include hardware and software running on the hardware, the virtual instances of the 5G wireless telecommunication network and their nodes are software constructs simulating the behavior of the physical counterparts. The processor can send the test request between the virtual instance of the 5G NR node and the virtual instance of the second node.

The processor can receive a response to the test request. The response can include a message or a determination that the test request is unanswered, when, for example, after a timeout period no response has been received. The processor can compare the received response to the defined criterion that the response to the test request needs to satisfy, and based on the comparison, the processor can determine whether the 5G NR node has passed the test. The processor can export the test request, the criterion, the received response, and the determination whether the 5G NR node has passed the test to a file. The processor can share the file with a provider of the 5G NR node, to indicate to the provider whether the 5G NR node has a problem, such as a bug, that needs to be fixed.

Figure 1:
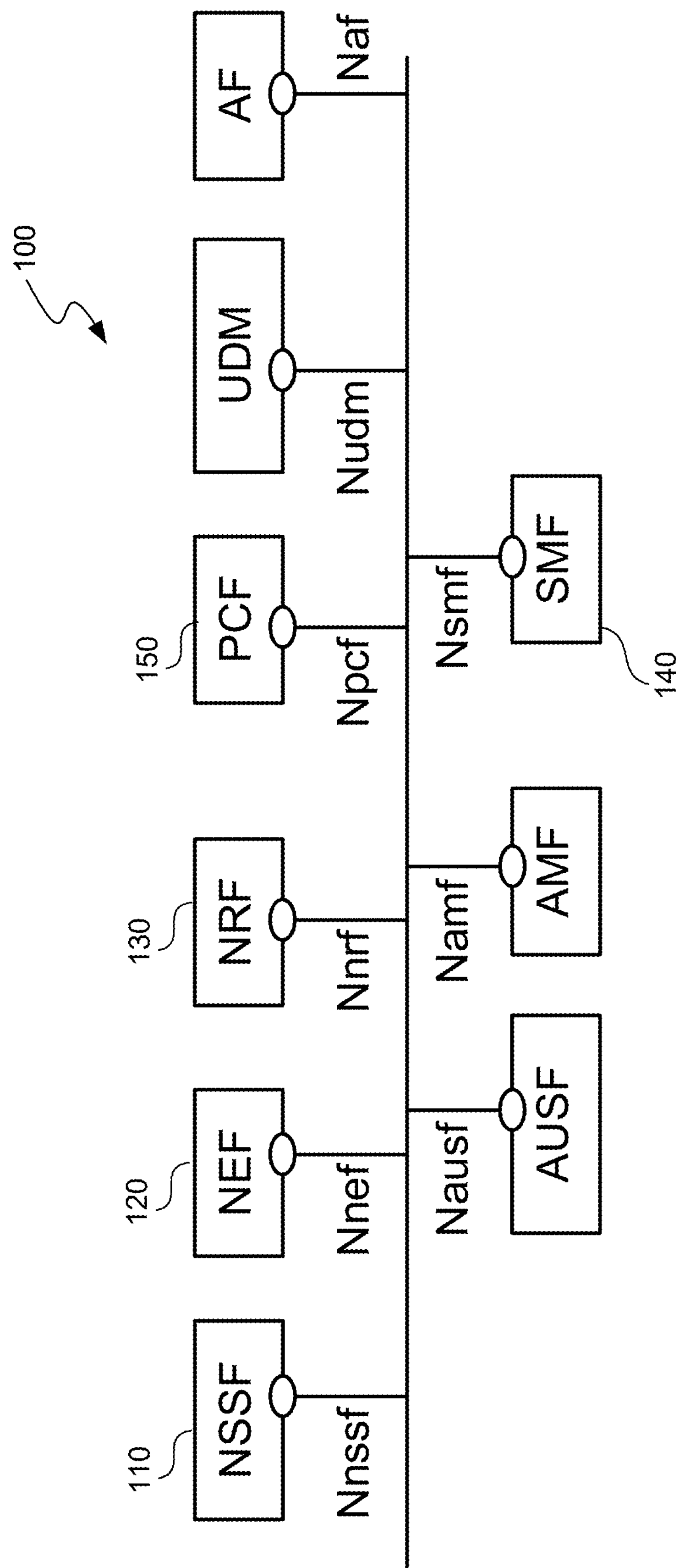
FIG. 1 shows some of the network nodes in a 5G wireless telecommunication network.

FIG. 1 shows some of the network nodes in a 5G wireless telecommunication network. The 5G System (5G S) architecture separates the 5G Core Network (5G C) into Control Plane (CP) and User Plane (UP) networks. The 5GC CP is a network 100 including a 5G NR core network node including network function (NF) elements, for example, network nodes (nodes) 110, 120, 130, 140, 150 (only five labeled for brevity) that act as consumers 140 and/or producers 150 of services. This Service Based Architecture (SBA) adheres to a RESTful architecture paradigm mandating NF elements, for example, nodes 110, 120, 130, 140, 150 to expose service application programmer interfaces (APIs).

In a typical procedure, an NF consumer invokes a service request to another NF producer using the HTTP method and a universal resource identifier specific to the service API. A series of these transactional request-responses are aggregated to build a Call Flow (CF), most of which are standardized and are detailed in a related NF technical specification (TS). Even a basic call flow to provide network service, like an audio call, has tens of service requests.

For example, any change in the network 100 that occurs, such as a hardware change, design change, or software patch, creates the risk of malfunction that can affect the users of the network. The system presented here enables automatic testing of the 5G network 100 prior to deployment, and even during the deployment. The testing can include conference calls, three-way calling, video calling, data service, streaming, etc.

For example, the system can be a testing tool to test out changes to the network 100 prior to release. Once the changes are released, the system can also be a monitoring tool to monitor performance of a wireless telecommunication network, such as a 5G network.

The system disclosed here, such as a simulation software, can create a virtual network 100 that can simulate interaction between the nodes 110, 120, 130, 140, 150 using the APIs exposed at the nodes 110, 120, 130, 140, 150. In addition, the system can take input from a user to create specific test cases of the network 100. The test cases can include requests and responses between the network nodes 110, 120, 130, 140, 150. The system can trigger multiple requests simultaneously to the nodes 110, 120, 130, 140, 150 and also store the received responses. In addition, the system, while the network 100 simulation is running, can change the parameters of the simulation, by for example changing the device under test (DUT), e.g., the node that is being tested.

FIG. 2 shows 5G core network nodes 200, 210, 220, 230, 240, 250, 260, 270, 280, 290, 205, 215, 225, 235, 245 that can be simulated by the system. The Access and Mobility Management Function (AMF) node 200 can receive all connection and session related information from the UE but is responsible only for handling connection and mobility management tasks. All messages related to session management are forwarded to the Session Management Function (SMF) node 230. As a mobile network comprises many AMF nodes 200 instances, a Globally Unique AMF Identifier (GUAMI) is used to identify each AMF node 200 uniquely.

Unified Data Management (UDM) node 210 manages network user data in a single, centralized element. UDM is similar to the 4G network's home subscriber service (HSS) but is cloud-native and designed for 5G specifically. UDM node 210 can be paired with the User Data Repository (UDR) which stores the user data such as customer profile information, customer authentication information, and encryption keys for the information. UDM resides on the CP and utilizes microservices to communicate between the UP and the CP.

The 5G Charging Function (CHF) node 220 forms part of the 3GPP's Converged Charging System, which encompasses support for both prepaid and postpaid billing within the same charging system.

The 5G SMF node 230 is a fundamental element of the 5G SBA. The SMF 230 is primarily responsible for interacting with the decoupled data plane, creating, updating and removing Protocol Data Unit (PDU) sessions, and managing session context with the User Plane Function (UPF).

PCF (Policy Charging Function) node 240 governs the CP functions via defined policy rules and UP functions via policy enforcement. PCF node 240 works very closely with CHF nodes 220 for usage monitoring. Through PCF node 240, operators can manage and govern network behavior. Key aspects like QoS control, traffic steering/routing, application and its capabilities detection, subscriber spending/usage monitoring, interworking with Internet protocol Multimedia Subsystem (IMS) nodes, enabling differentiated services, gating control, network slice enablement, and/or roaming support, etc. are supported by PCF node 240.

User plane function (UPF) node 250 is a fundamental component of a 3GPP 5G core infrastructure system architecture. The UPF 250 represents the data plane evolution of a Control and User Plane Separation (CUPS) strategy, first introduced as an extension to existing Evolved Packet Cores (EPCs) by the 3GPP in the Release 14 specifications. CUPS decouples Packet Gateway (PGW) control and user plane functions, enabling the data forwarding component (PGW-U) to be decentralized. This allows packet processing and traffic aggregation to be performed closer to the network edge, which increases bandwidth efficiencies while reducing network load. The PGW's handling of signaling traffic (PGW-C) remains in the core, northbound of the Mobility Management Entity (MME).

Application Function (AF) node 260 performs operations like accessing Network Exposure Function (NEF) node 290 for retrieving resources, interacting with PCF node 240 for Policy Control, Applications Traffic Routing, exposing services to end users, etc. AF node 260 exposes the application layer for interacting with 5G network resources.

The Authentication Server Function (AUSF) node 270 is in a home network and performs authentication with a UE. AUSF node 270 makes the decision on UE authentication, but AUSF node 270 relies on backend service for computing the authentication data and keying materials when 5G-AKA or EAP-AKA is used.

The Non-3GPP Interworking Function (N3IWF) node 280 is responsible for routing messages outside the 5G Radio Access Network (RAN).

NEF node 290 exposes services and resources over APIs within and outside the 5G core. Services exposure by NEF is based on RESTful APIs over a service based interface bus. With the help of NEF nodes 290, third-party applications can also access the 5G services. NEF node 290 acts as a security layer when an outside application tries to connect with the 5G core network functions.

The Network Slice Selection Function (NSSF) node 205 selects the Network Slice Instance (NSI) based on information provided during UE attach. A set of AMF nodes 200 are provided to the UE based on which slices the UE has access to.

The short message service function (SMSF) node 215 supports the transfer of short message service (SMS) over Non-Access Stratum (NAS). In this capacity, the SMSF 215 will conduct subscription checking and perform a relay function between the device and the SMSC (Short Message Service Center), through interaction with the AMF 200.

The Security Edge Protection Proxy (SEPP) node 225 is used to protect CP traffic that is exchanged between different 5G PLMNs (Public Land Mobile Networks). As such, the SEPP node 225 performs message filtering, policing and topology hiding for all API messages.

The Network Repository Function (NRF) node 235 is a key component of the 5G SBA. The NRF maintains an updated repository of all the 5G elements available in the operators network along with the services provided by each of the elements in the 5G core that are expected to be instantiated, scaled and terminated with minimal or without manual intervention. In addition to serving as a repository of the services, the NRF node 235 also supports discovery mechanisms that allow 5G elements to discover each other and get updated status of the desired elements. The NRF supports the following functions: maintain the profiles of the available NF instances and their supported services in the 5G core network; allow consumer NF instances to discover other providers NF instances in the 5G core network; and allow NF instances to track the status of other NF instances.

Lawful Interception (LI) 245 is a security process in which a service provider or network operator collects and provides law enforcement officials with intercepted communications of private individuals or organizations after receiving a valid warrant to do so.

Figure 3:
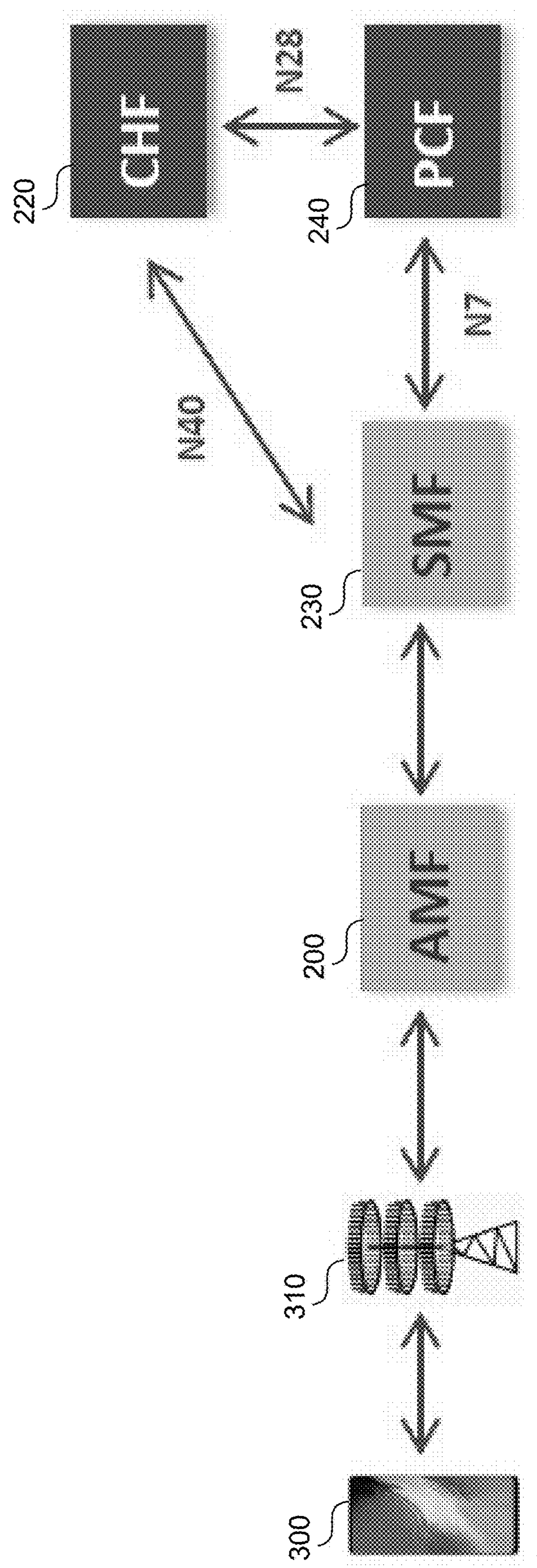
FIG. 3 shows some of the 5G core network nodes in a 5G network involved in communicating with a User Equipment (UE).

FIG. 3 shows some of the 5G core network nodes in a 5G network involved in communicating with a UE. The UE 300 connects to a tower 310 to send and receive text, phone calls, Internet data, etc. The AMF nodes 200 can receive all connection and session related information from the UE 300 and can forward the received information to the SMF node 230.

The SMF node 230 can communicate with the PCF node 240 and the CHF node 220. PCF node 240 can work very closely with CHF node 220 for usage monitoring. Through PCF node 240, operators can manage and govern network behavior.

CHF node 220 and the PCF node 240 can monitor how much a user is utilizing data and voice and what to charge the user. CHF 220 enforces the policy for the user. For example, the user is using the data plan and browsing Netflix, which requires a higher bandwidth than voice or text. The CHF nodes 220 and the PCF node 240 can monitor the quality of service, how much data the UE 300 needs, how much data the UE is using, and how much data the UE is allowed. The PCF node 240 can enforce data plan limits on the UE 300. The PCF and the CHF nodes 240, 220 can communicate with each other and other nodes in the network 100 in FIG. 1 using the HTTP/2 protocol. The user can have a data plan that allows 10 GB of high bandwidth data per month. This information can be available to the CHF nodes 220. When the CHF node 220 in the PCF node 240 determined that the user has used up all of 10 GB of data per month, the CHF and PCF nodes can reduce the bandwidth available to the user to lower bandwidth.

The communication happening between the PCF node 240 and the CHF node 220 involves request and response communication using an HTTP protocol such as the HTTP/2 protocol. The system described in this application can simulate the requests and responses between the PCF node 240 and the CHF node 220.

The system can simulate multiple CHF nodes 220, such as CHF1, CHF2, CHF3, CHF4 nodes, individually or simultaneously. The system can run multiple tests, more than a thousand tests, at the same time, and can record the results such as requests and responses sent and received between the simulated nodes 220, 240. While the system is running a test on the CHF1, while the test is happening, an additional node such as CHF2 and CHF3 can also be added to the running test. Consequently, the test can simultaneously test the performance of multiple nodes.

A hardware or software processor executing instructions described in this application can analyze the recorded results of the multiple tests by identifying tests that have failed, and trends in the field tests. For example, the processor can identify if failed tests are similar, and what are the most commonly failed tests. The processor can flag those most common failures and notify a system administrator to fix those failures. The system administrator can be an artificial intelligence module. In another example, the processor can identify if failed tests are different, but if those tests have the same software version. In that case, the processor can determine whether the difference comes from the different nodes, such as CHF1 versus CHF2, that were tested. The processor can flag those tests for further investigation and notify the system administrator.

Figure 4A:
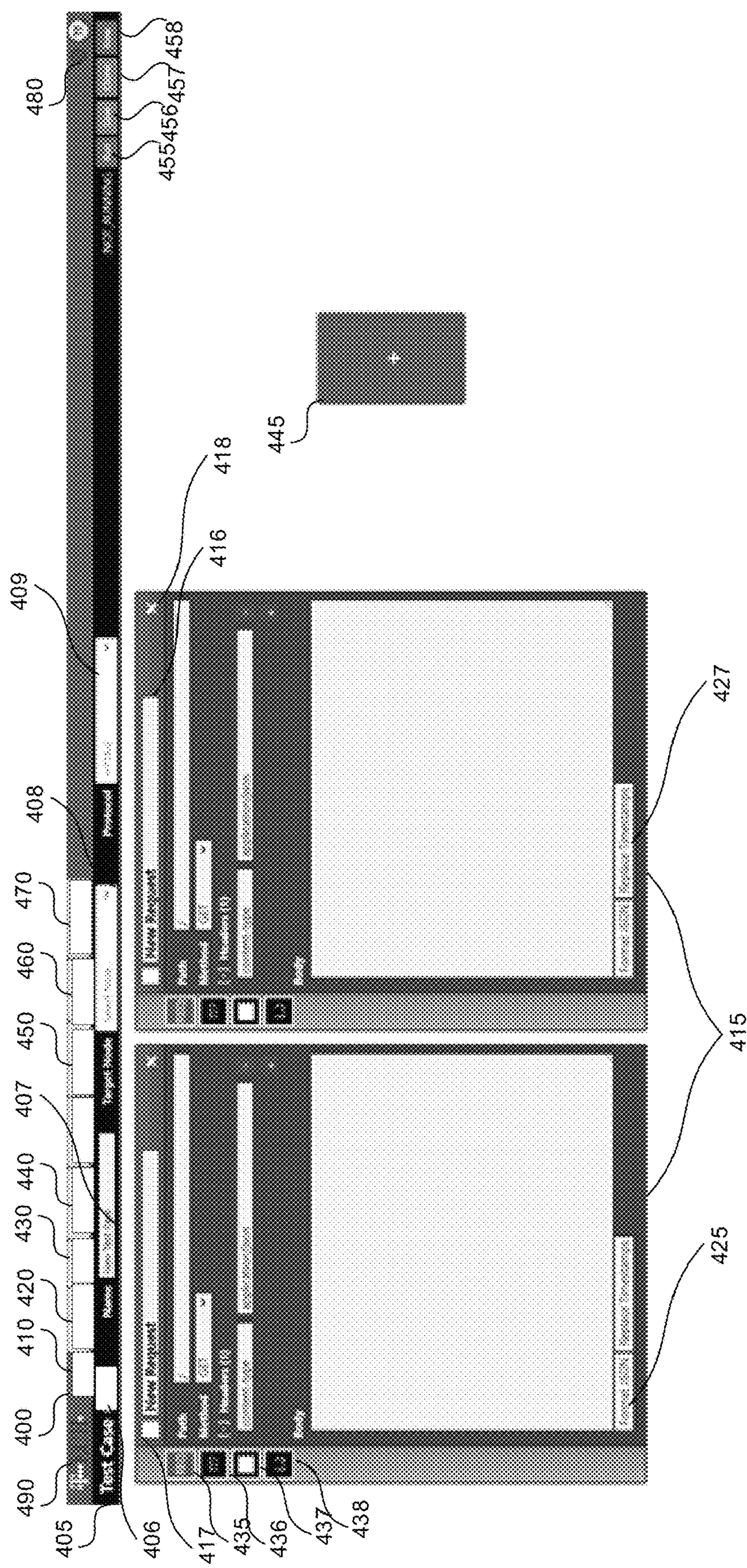
FIG. 4A shows a user interface of the system.

FIG. 4A shows a user interface of the system. The system includes a web-based tool for creating, editing, and running test cases that consist of a sequence of HTTP/2 requests sent to a host. Verification criteria can be defined for each request to verify that the response has certain desired fields and values. Additionally, test cases can be grouped into batches so multiple test cases can be run at the same time.

There are two ways to run a test case or a batch. One way is to open the test case or batch in the editor and run the test case or a batch from there. When the test case or batch is run this way, results are displayed on the page in real time as the information becomes available. This feature is especially useful when creating a new test case, as the user can verify that they have entered the information correctly and completely before saving the test case.

The second way is to run the test case or batch from a list page. When a run is started this way, the page displays a job ID. The results are not displayed in real time like the editor, but instead will show up on either the test case results page or the batch results page, depending on which test was run.

Test cases are the main unit of work performed by the tech tool. Test cases have an identifier (ID), a name, a node, and a protocol. The ID uniquely identifies the test case. The name helps the user identify the test case.

The node is the node to which all requests in the test case will be sent. The node can be one of the 5G nodes 200-290 in FIG. 2. The protocol is the version of the HTTP protocol to use when sending the requests.

Each request has the standard fields of an HTTP request in addition to validation criteria and context mappings. The standard HTTP fields determine the specifics of the request that will be sent to the host specified in the test case. The content-length header is automatically calculated.

Validation criteria are used by the execution engine to determine whether the response passes or fails. The validation system uses substring matching to determine the validity of the response. If the value specified in the validation criterion is present in the value of the specified context entry, the response has passed. Otherwise the response fails.

Figure 4B:
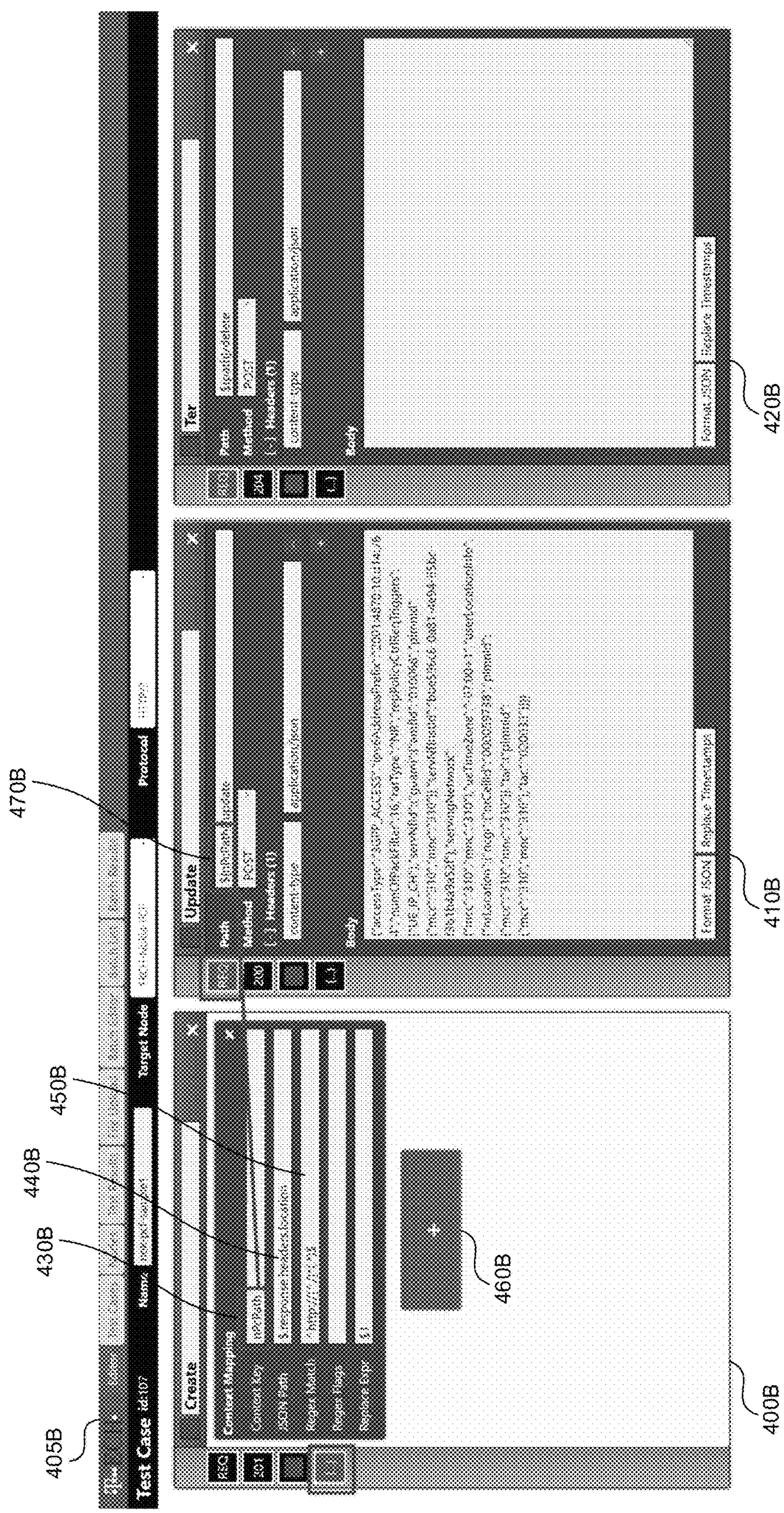
FIGS. 4B-4E show an example of context mapping.
Figure 4C:
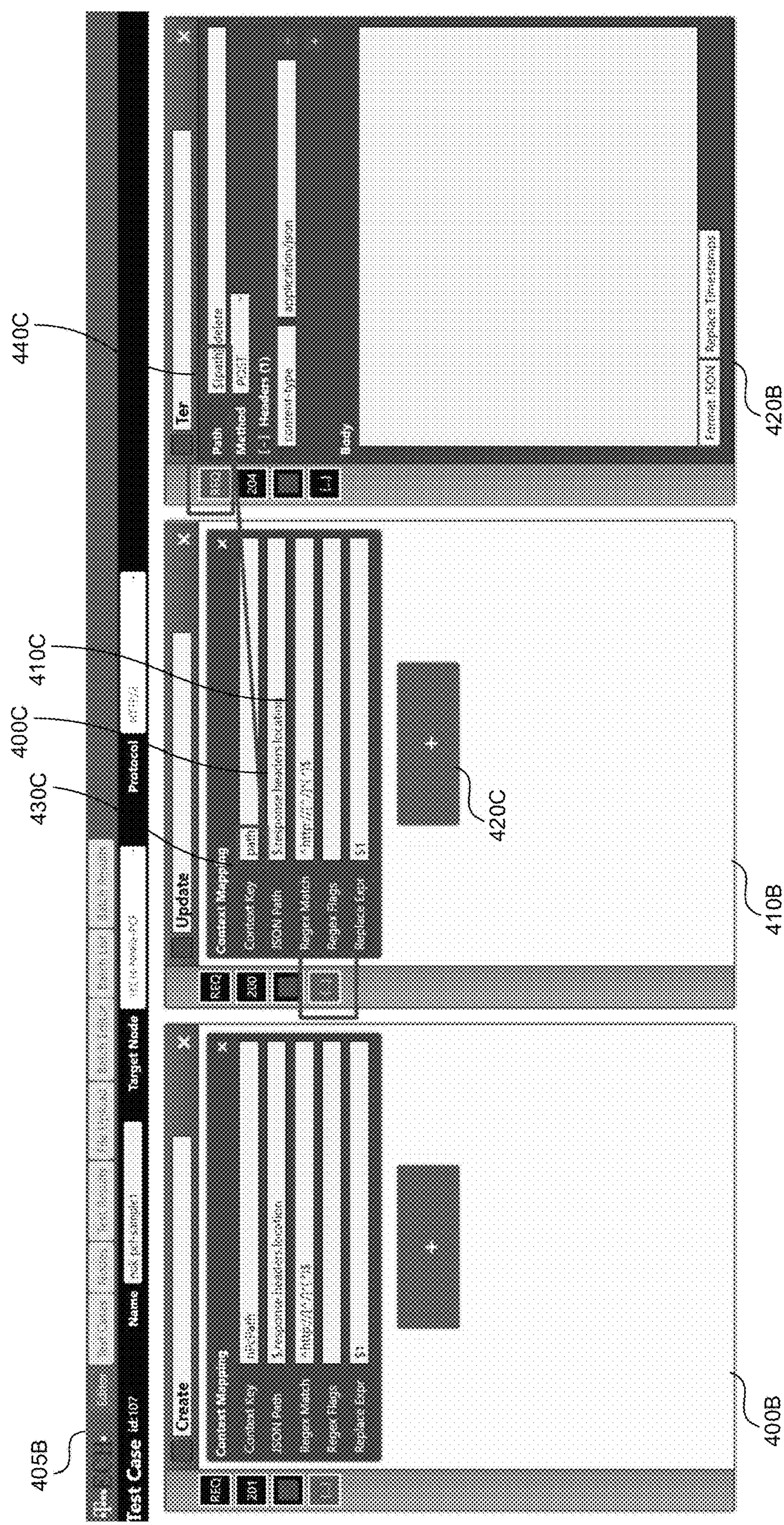
Figure 4D:
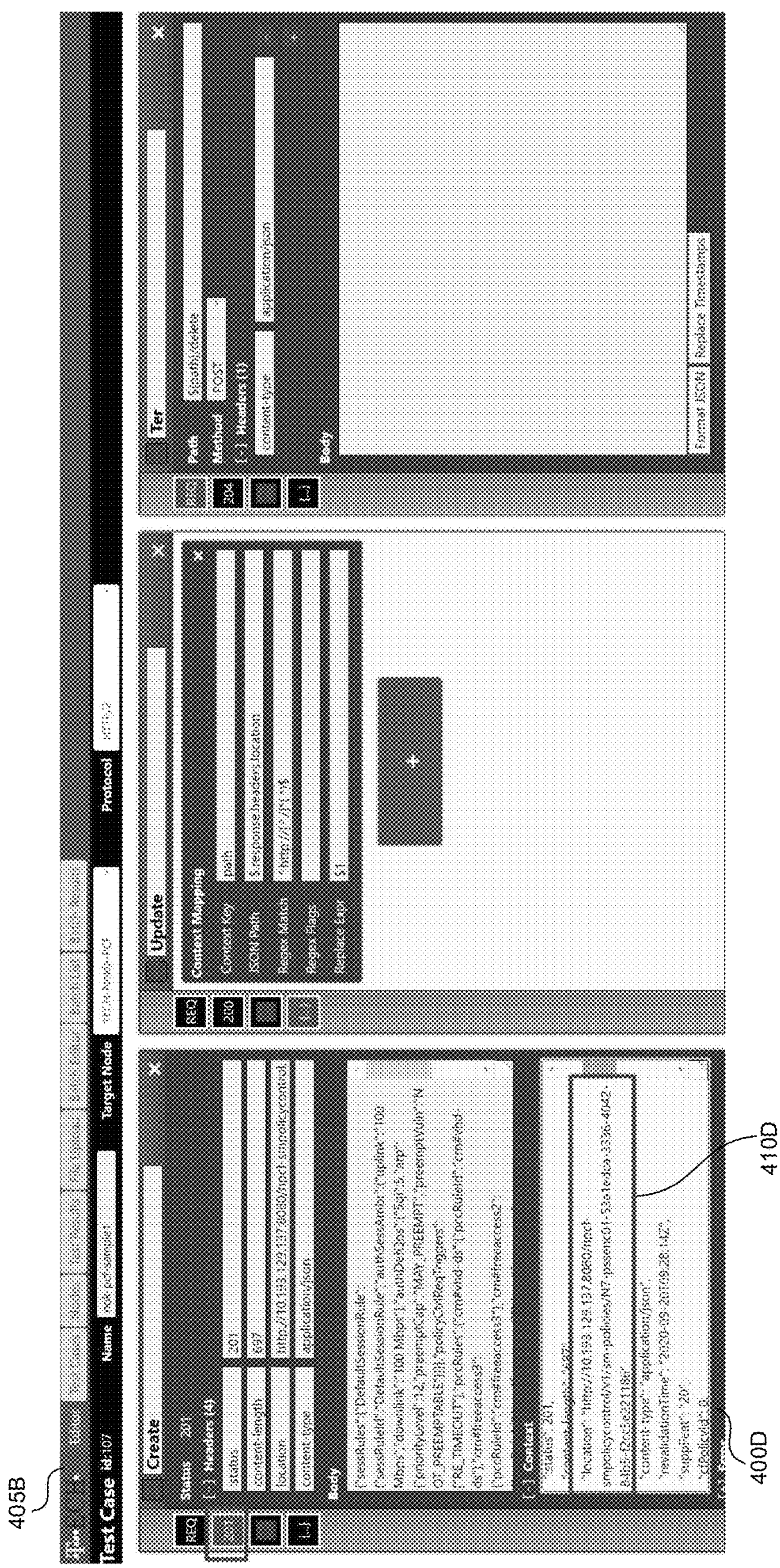

Context mappings, explained in detail in FIGS. 4B-4D, can be used to map data from a request or the response received from the host into the execution context of the test case during runtime. Once the data is stored in the context, it can be referenced in the validation criteria and in any field of the next request. The mapping is specified by providing a context key and a standard regular expression broken up into several fields. One field is for the flags, another for the match expression, and the last for the replace expression.

Navigation among the main pages of the site can be achieved using the navigation bar (nav bar) 400. The pages for editing 410, running 420, browsing 430, and viewing results 440 of test cases are separate from pages for performing those actions for batches 450, 460, 470. Each page is described in this document.

The color of the circle 480 indicates the connection status of the system web UI to the system backend. This circle 480 indicates a connection problem when it is not a predetermined color, such as green, and the site may not work properly. In that case, running test cases and batches from their editors will not display the results in real time. An active connection to the backend is needed for this functionality to work. The system will continuously try to reconnect if the web UI is disconnected for any reason.

When the editor button 410 is selected, the web UI shows the test case editor page 490. The user can create, edit, and/or run test cases on the test case editor page 490.

Test case information section 405 includes multiple fields 406, 407, 408, 409, which can be used to set information about the test case such as its name, node, and protocol.

Field 406 shows the test case ID. The value will be null until the test case is saved. The ID uniquely identifies the test case.

Field 407 shows the name of the test case. The name provides a way for human users to easily recognize a test case. The names do not need to be unique.

Field 408 shows a target node. The target node is the node to which all requests in the test case are sent. The node can be one of the nodes 200-290 in FIG. 2. The node must exist in a system database for a test case to use it.

Field 409 shows the version of the HTTP protocol used by the system backend to send the requests to the server. The HTTP protocol can include HTTP/2 protocol, an HTTPS protocol, or an HTTP 1/1 protocol.

Each of the request boxes 415 represents a single HTTP request. The text box 416 (only one labeled for brevity) is the name of the test case. The box 417 to the left (only one labeled for brevity) is the request status indicator. The color of the box 417 represents the status of the request. The button 418 removes the request 415 from the test case.

Request Body Controls buttons 425, 427 allow users to quickly format JSON in the body of a request and replace International Organization for Standardization (ISO) timestamps with a variable that is expanded to the current time just before the request is sent.

Button 425 formats the JSON body of the request. If the body does not contain valid JSON, nothing will happen when this button is clicked.

Button 427 replaces ISO timestamps in the body of the request with a context variable ("${now_timestamp}") that will be expanded when the test case is executed. The value will be the ISO timestamp for the time immediately before each request is sent.

Request Data View Selectors buttons 435, 436, 437, 438 display different data associated with each request. In FIG. 4A, button 435 is selected. Button 435 displays the basic HTTP request info. Additional views include Response Data 436, Validation Criteria 437, and Context Mappings 438. The views are described here in order of the buttons from top to bottom.

When the Request Data View button 435 is selected, the user can view and modify the request that will be sent to the node.

When the Response Data View button 436 is selected, the user can view the response returned from the node, if available.

When the Validation Criteria View button 437 is selected, the user can view and modify the criteria used to determine whether this request has passed or failed the test.

When the Context Mappings View button 438 is selected, the user can use this view to view and modify the context mappings for this request. Context mappings can be used to select data from the response for use in validation criteria or the next request.

New Request button 445 adds a new request to the test case. There is no limit to the number of requests a test case can have. To remove a request, the user can select button 418.

Test Case Controls buttons 455, 456, 457, 458 are used to run test case level operations. Run button 455 can execute the test case in editor mode. The requests can be sent to the selected node sequentially. Response data can be displayed as soon as it becomes available. The result of the execution may not show up in the Test Results list when the test case is run from the editor.

Save button 456 saves the test case. If the test case already has a test case ID, the test case is updated. If the test case does not have an ID, a new ID is assigned, and a new test case is created.

Clone button 457 creates, but may not save, a copy of the current test case. The clone button 457 can be used to quickly create similar test cases. New button 458 creates a new, empty test case.

FIGS. 4B-4E show an example of context mapping. FIG. 4B shows a test 405B having multiple requests 400B, 410B and 420B. With context mapping, a processor can use part of response to first request 400B in the second request 410B, or in a subsequent request's 420B payload. Context mapping helps to store first request response into one or more predefined variables which can be used in second request 410B and later requests 420B. Similarly, context mapping helps to store second request 410B response into multiple predefined variables which can be used in third request 420B and later requests.

Before test 405B execution, the processor can create and store additional in-session context mapping variables using user interface elements 460B, 420C in FIG. 4C.

Request 400B is a request to create, request 410B is a request update, and request 420B is a request to terminate. The processor can pre-definine a context mapping variable, for "nPcPath" 430B, in first request 400B. The processor can search in the create request 400B response for text matching "response"→"headers"→"location" parameters, specified by element 440B, namely, "$.response.headers.location". The processor can match and retrieve part of the response text that matches "http://(anything)/" and store all the text after that. Element 450B, ("^http://[^/]*(.*)$"), specifies the string to match and the string to store.

To establish context mapping between requests 400B and 410B, the variable "nPcPath" 430B is referenced in request 410B, element 470B.

FIG. 4C shows how to pre-define a context mapping variable, for element "path" 430C in second request update 410B. The processor can search in the update request 410B response for text matching "response"→"headers"→"location" parameters, specified by element 400C, namely, "$.response.headers.location". The processor can match and retrieve part of the response string that matches "http://(anything)/" and store everything after that. Element 410C, ("^http://[^/]*(*)$"), specifies the string to match and the string to store.

To establish context mapping between requests 410B and 420B, the variable "path" 430C is referenced in request 420B, element 440C.

Figure 4E:
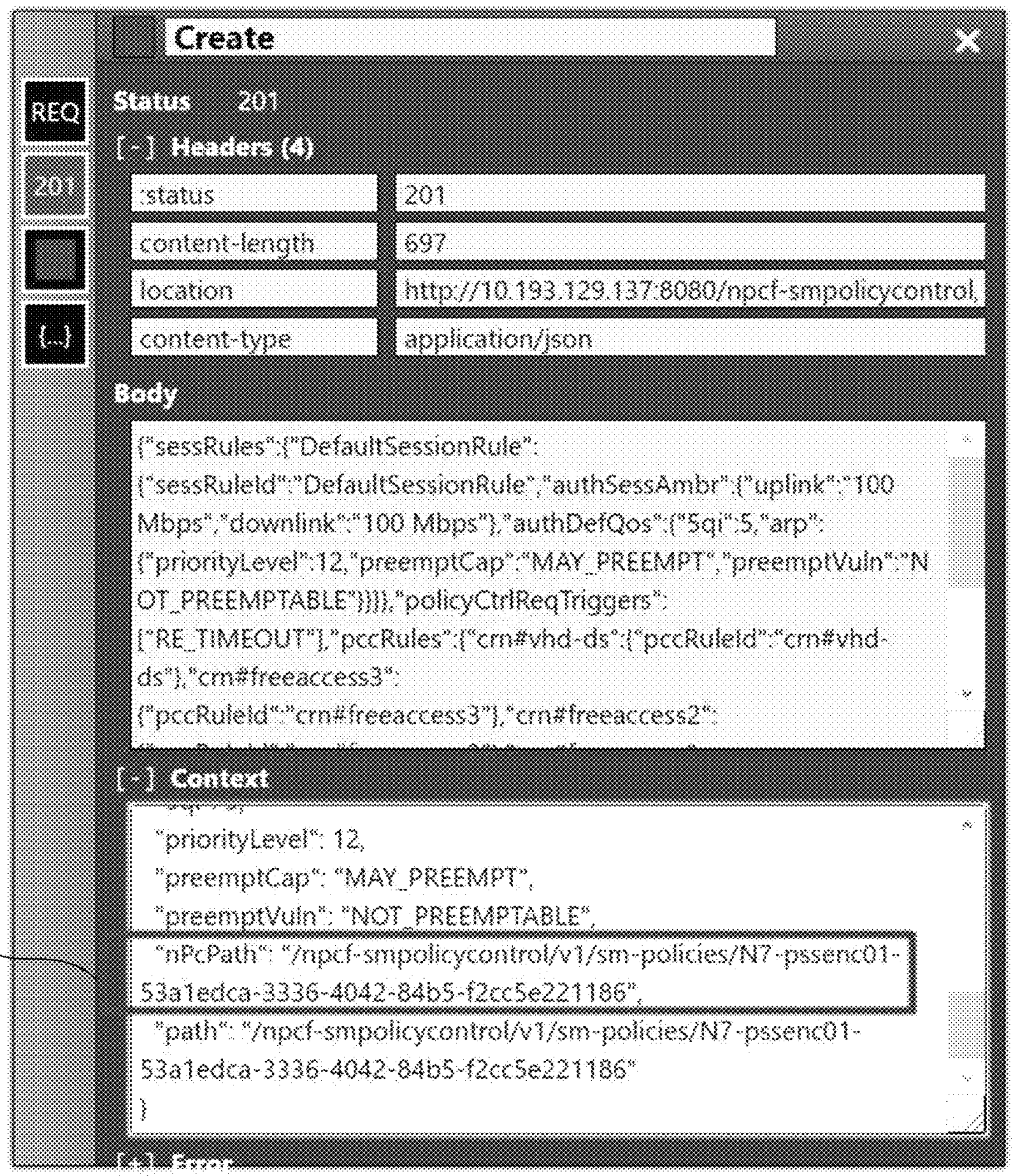

FIGS. 4D-4E show the mapping of the responses into the variables. After test 405B execution a processor can capture a part 420E of first request 400B response 400D. The response 400 the can include string 410D "location": http://10.193.129.137:8080/npcf-smpolicycontrol/v1/sm-policies/N7-pssenc01-53a1edca-3336-4042-84b5-f2cc5e221186. The part 420E of the string 410D, namely "Thpcf-smpolicycontrol/v1/sm-policies/N7-pssenc01-53a1edca-3336-4042-84b542cc5e221186", matches the regular expression specified by the element 450B, ("^http://[^/]*(.*)$"). Consequently, the processor assigns the part 420E of the string 410D to the variable 430B.

The processor can use the variable 430B in the second request 410B payload, and also as needed on the further requests payloads as well. For example, the processor can map the variable 430B to variable 470B in FIG. 4B, 430C in FIG. 4C, by assigning part 420E of the string 410D to the variable "path" 470B, 430C.

Figure 5:
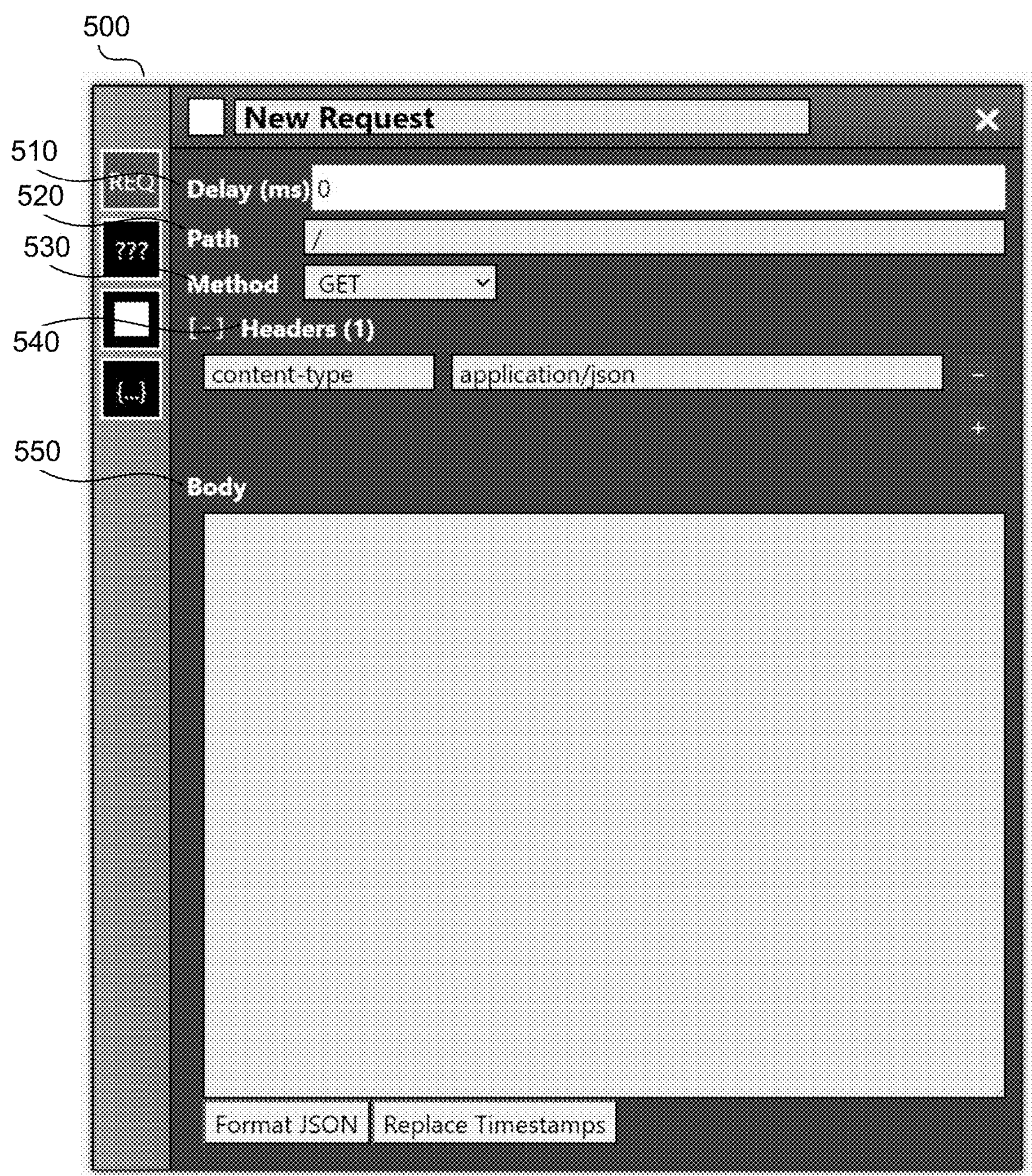
FIG. 5 shows a new request.

FIG. 5 shows a new request. The new request 500 can have multiple functionalities through buttons 510, 520, 530, 540, 550.

Delay button 510 specifies milliseconds to wait before sending the request 500. The time begins as soon as the previous response is received. Time stamps that have been replaced will use the time after the delay to fill in values.

Path button 520 specifies the path to use for the request 500. If the selected node is example.com, to access example.com/login, the user can use "flogin" as the path. Method button 530 specifies the HTTP method to use for the request 500.

Headers button 540 specifies the HTTP headers for the request. The content-length header is automatically added to each request. Body button 550 specifies the body of the request 500. Any text entered here can be sent as the body of the request. The Format JSON requires a correctly formatted JSON body to work properly, and the Replace Timestamps is designed for use with a JSON body but can work with other body formats.

Figure 6A:
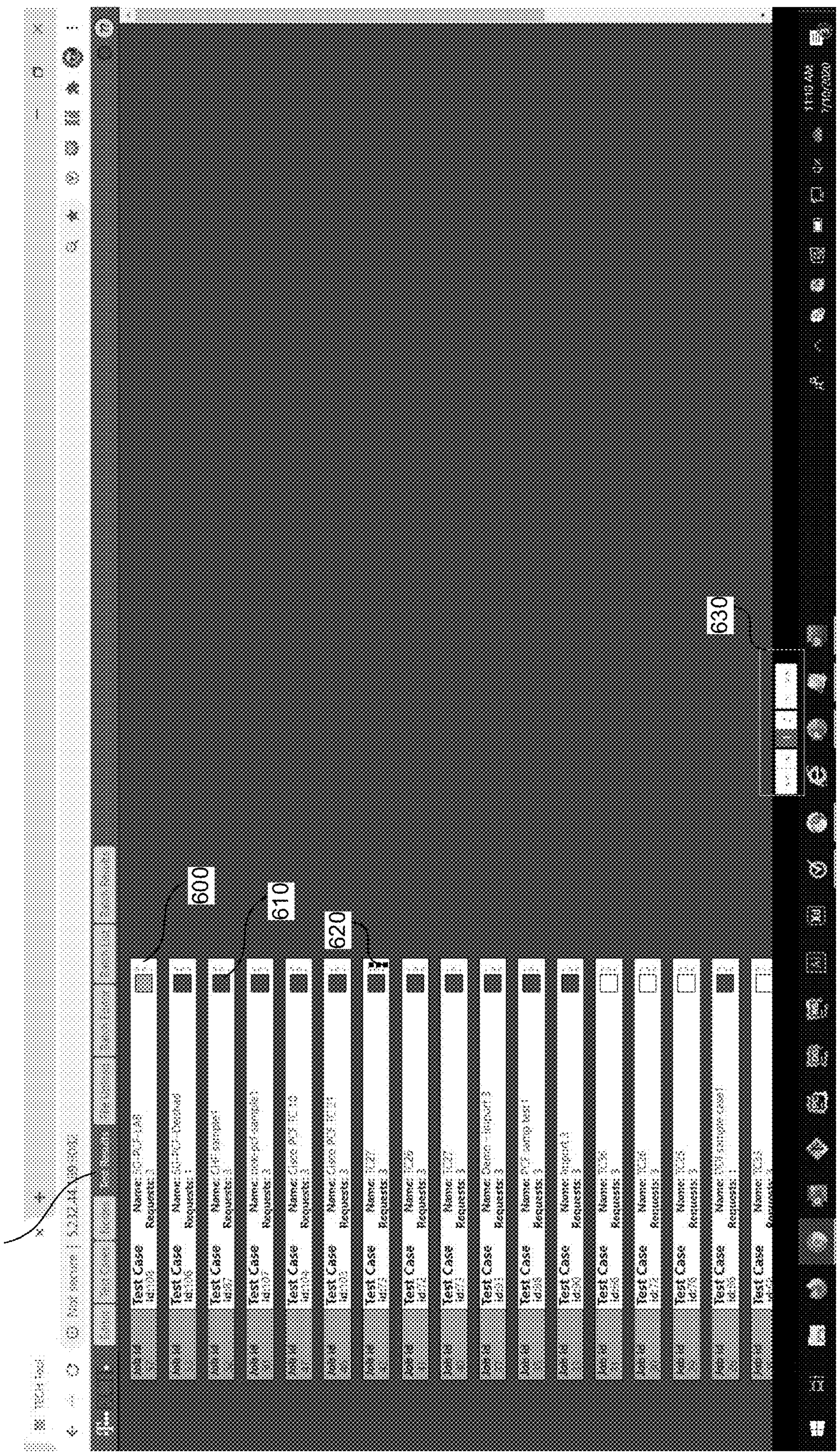
Figure 6B:
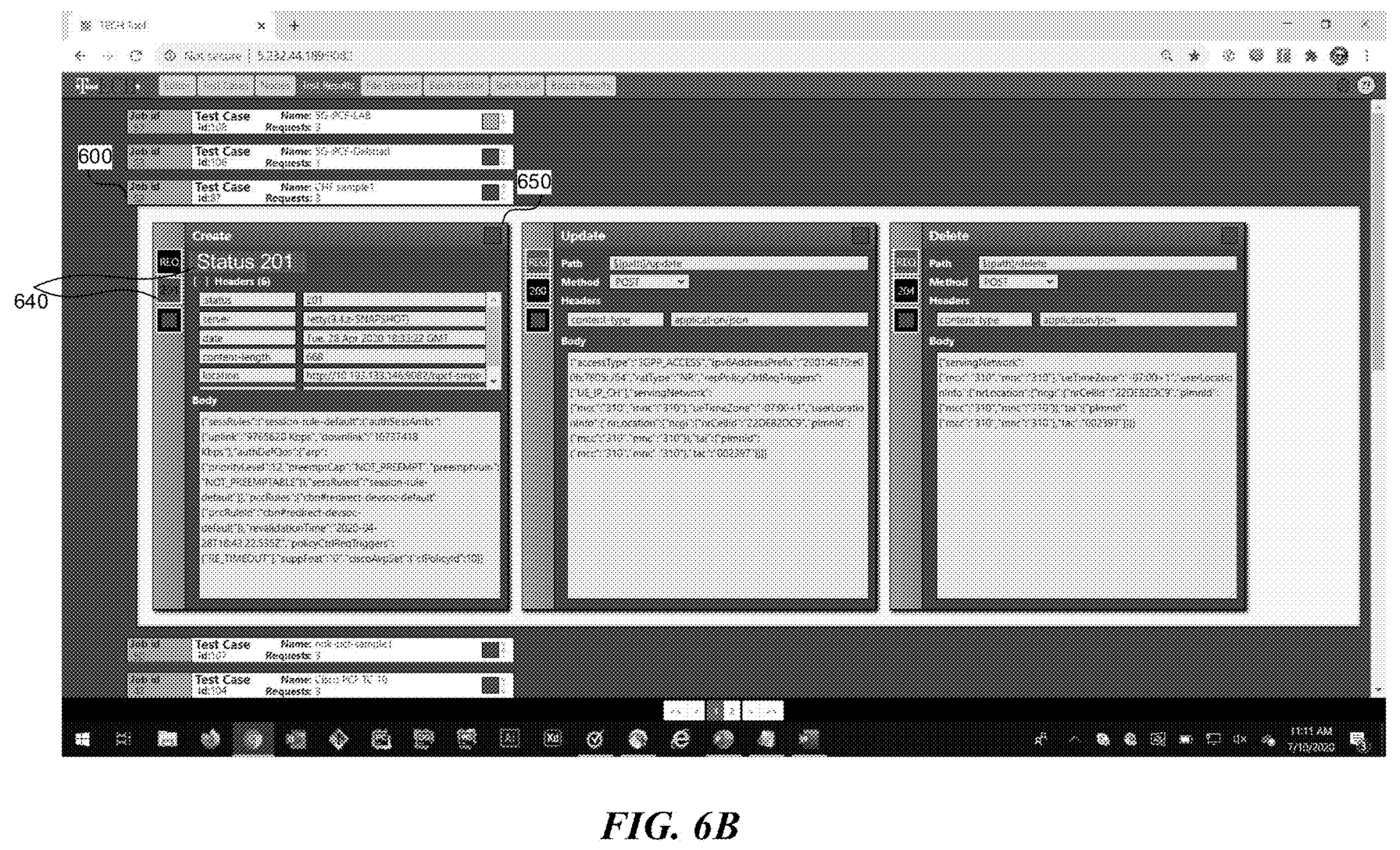

FIGS. 6A-6B show a test results web page. When button 440 is selected, a processor can provide information about the results of a test case.

Item 600 displays high-level information about a test case result including which test case was run, the job ID, and the status. When item 600 is selected, the processor can expand the test case execution result, as described herein.

The color of item 610 represents the status of the test case job. For example, color white can indicate that there is no status information. Color green can indicate that a test case has executed and passed validation. Color red can indicate that the test case has executed and failed validation. Color orange can indicate that the test case encountered an error while executing.

Menu button 620, can provide more options for this test case result. Page selector 630 enables the user to select which page of results to view.

FIG. 6B shows the results of expanding the test case execution result by selecting the button 600. Toggling the button 600 can expand the test case execution results and/or collapse the test case execution results. If the test results are expanded, selecting the button 600 collapses the test results.

HTTP Status Indicator 640 shows the HTTP status of the response. Request Status Indicator 650 shows the test status of the request, such as whether or not validation passed.

Figure 7:
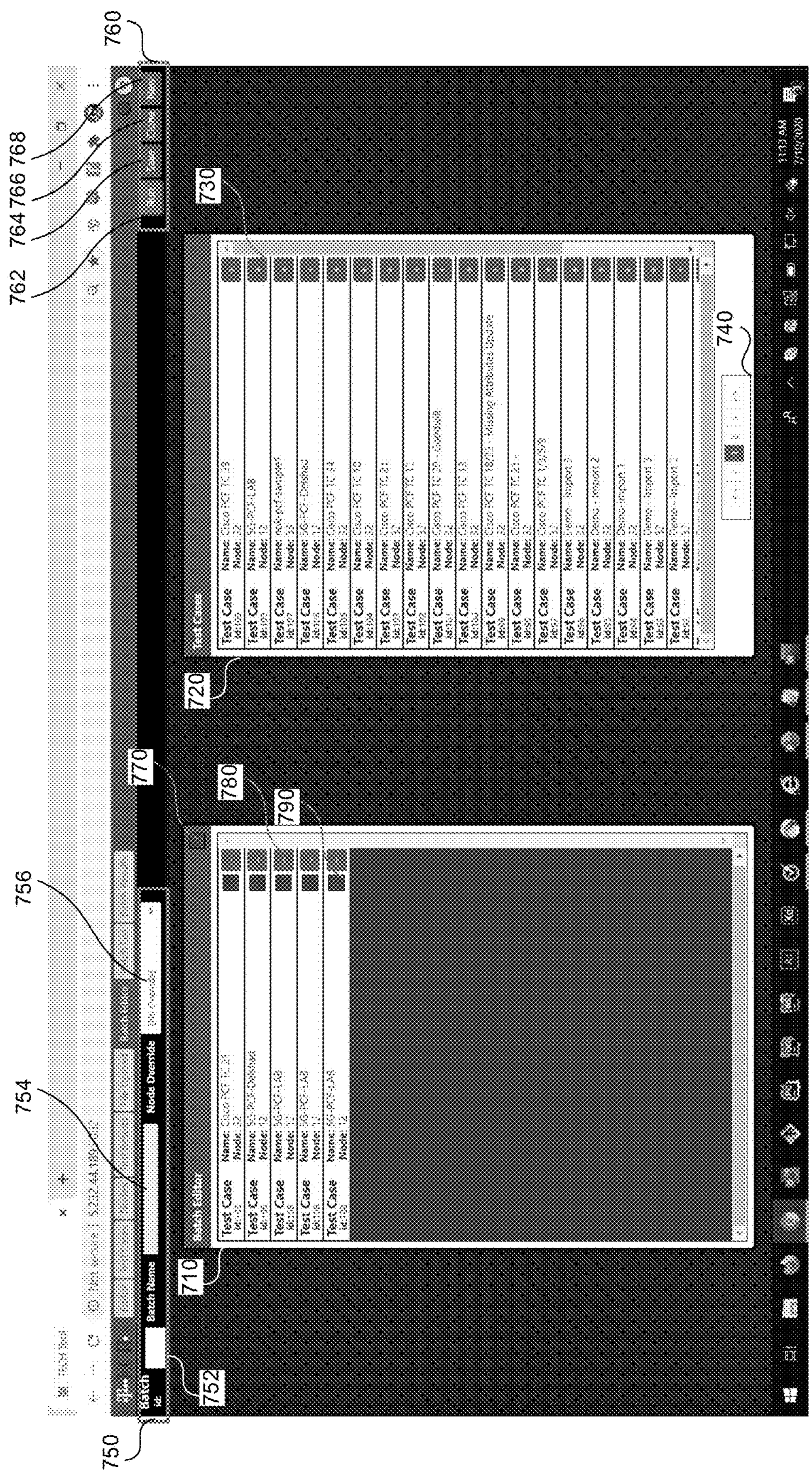
FIG. 7 shows a batch editor.

FIG. 7 shows a batch editor. When button 450 is selected, a processor can provide the batch editor to a user.

Batch Editor Pane 710 shows the test cases in a batch. When the batch is run, the test cases can be run in order, one at a time, with no delay in between each test case.

Test Cases Pane 720 allows the user to browse test cases and add them to the batch.

Add Test Case to Batch button 730, when selected, adds the test case to the batch. Test cases are added to the end of the batch, and one test case can be added to a batch multiple times.

Test Case Page Selector 740 can enable the user to navigate pages of test cases. Selecting the currently active page can cause the list to refresh the list of test cases for that page.

Batch Information 750 enables the user to modify information about the batch. Batch ID 752 uniquely identifies a batch. A NULL value indicates the batch has not yet been saved. Batch Name 754 helps users to recognize a batch. Node Override 756 can override the node used in each test case in the batch. Requests can be sent to this node instead of the node configured in the test case.

Batch Controls 760 are analogous to the Test Case Controls 455, 456, 457, 458 in FIG. 4A in the test case editor. Batch Controls 760 perform operations on the whole batch. Run button 762 can execute the batch. Test cases are executed in order, one at a time.

Save button 764 saves the batch. Once the batch is saved, the ID should be set to a number (not NULL). The batch may not show up in the batch list until the batch is saved.

Clone button 766 can make a duplicate of the test case. The Clone button 766 creates a new batch in the editor with the same data as the previous batch. This feature can speed up creation of multiple batches. New button 768 can create a new batch. This creates a new, empty batch.

The color of the Batch Execution Status Indicator 770 indicator represents the status of executing the whole batch. Remove Test Case from Batch button 780 can remove a test case from the batch. Test Case Execution Status Indicator 790 can indicate the status of executing an individual test case contained by the batch.

Figure 8:
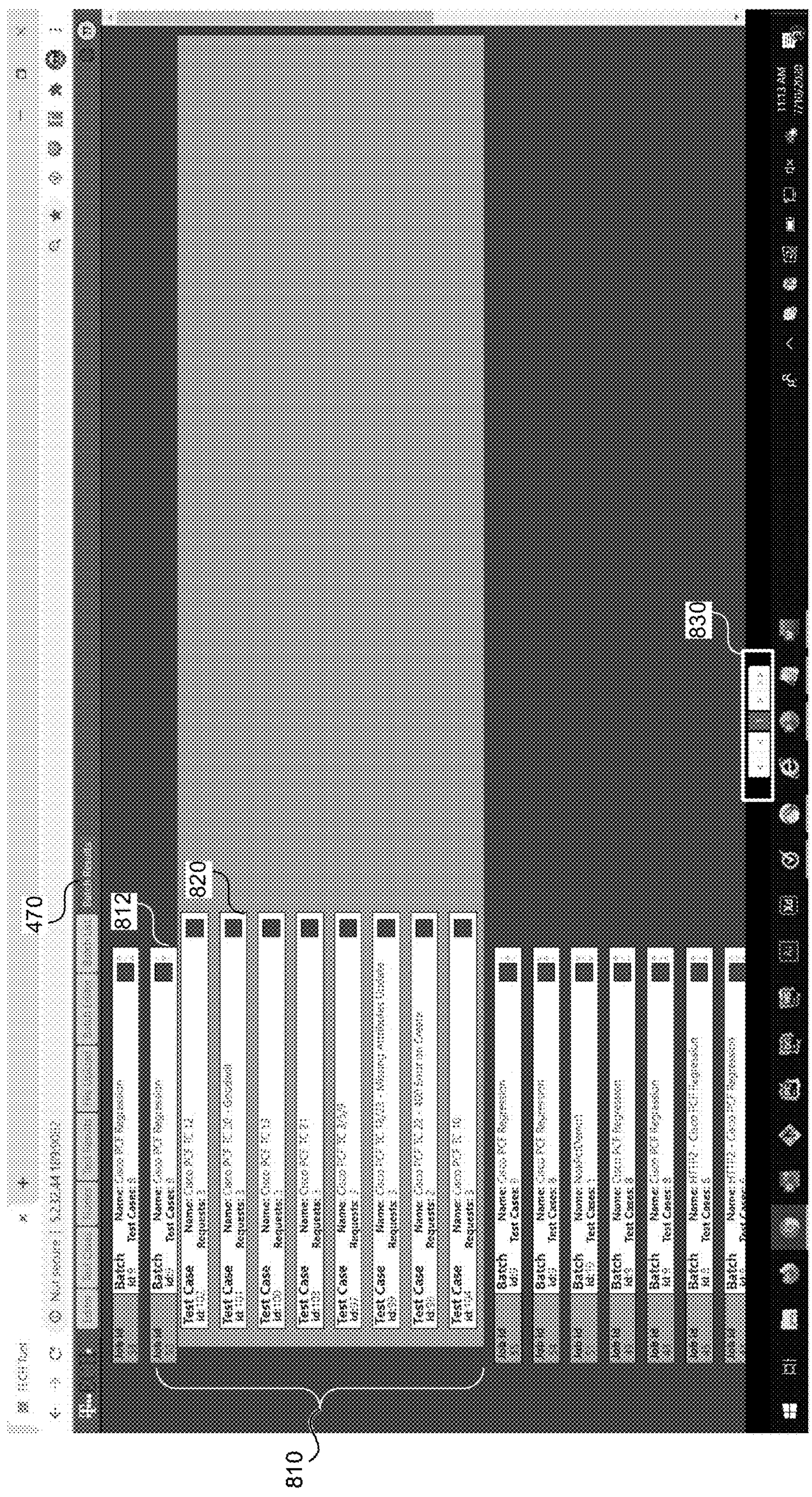
FIG. 8 shows a batch results web page.

FIG. 8 shows a batch results web page. When button 470 is selected, a processor can provide information about the results of a batch of test cases.

The expanded Batch Result Entry 810 represents the result of executing a batch from the batch list page. Selection of item 812 (only one labeled for brevity) can expand and collapse the batch result.

The collapsed Test Case Result Entry 820 represents the result of executing a single test case in a batch. Item 820 is nearly identical to the item 600 in FIGS. 6A-6B. Selection of item 820 can expand and collapse the test case result, as described in FIGS. 6A-6B.

Batch Result Page Selector 830 can enable a user to navigate among the pages of batch results. Selecting the number of the currently selected page will update the batch list.

The expanded Batch Result Item 840 can be shown when the collapsed Test Case Result Entry 820 is selected. The item 840 represents the result of executing a batch from the batch list page. Selecting the expanded Batch Result Item 840 can collapse the batch result.

Figure 9:
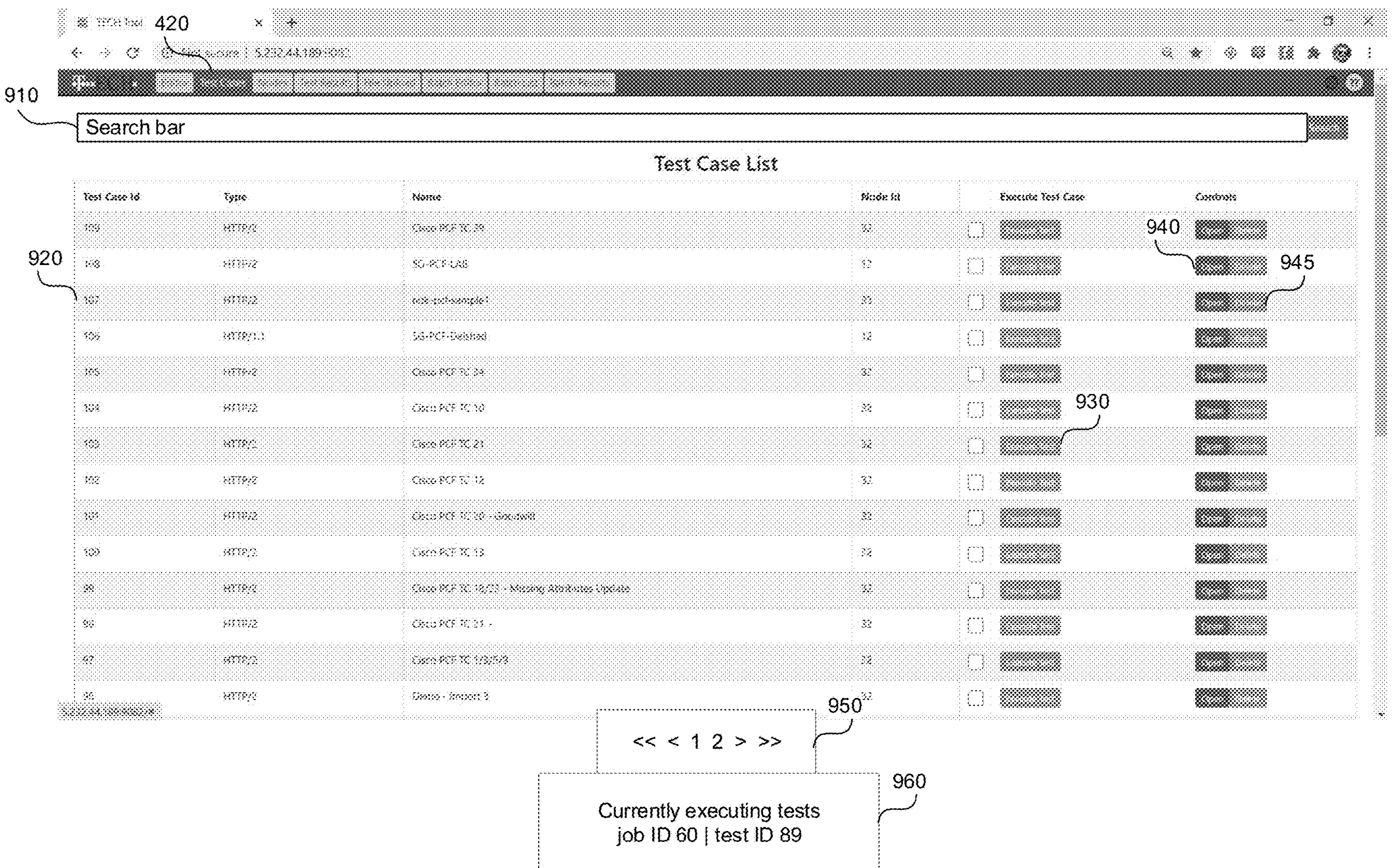
FIG. 9 shows a list of test cases.

FIG. 9 shows a list of test cases. When button 420 is selected, a processor can provide the list of test cases.

Search by ID 910 enables a user to search the database for a test case by its ID. If the test case exists in the database, the test case will be provided to the user.

Each row 920 (only one labeled for brevity) represents a single test case that has been saved. Some information about the test case is displayed along with a few controls.

Selecting the button 930 executes a test case that has been saved. Once the test case has been executed, its ID will show up at the bottom of the page in box 960.

Test Case Controls 940, 945 enable a user to interact with a single test case. Open button 940 enables a user to open a saved test case in the test case editor. The test case can be viewed, modified, run, or cloned once it has been opened. The Delete button 945 enables the user to delete a test case.

Page Selector 950 enables a user to navigate among the pages of the test case list. Box 960 shows the IDs of the test cases that are currently executed.

Figure 10:
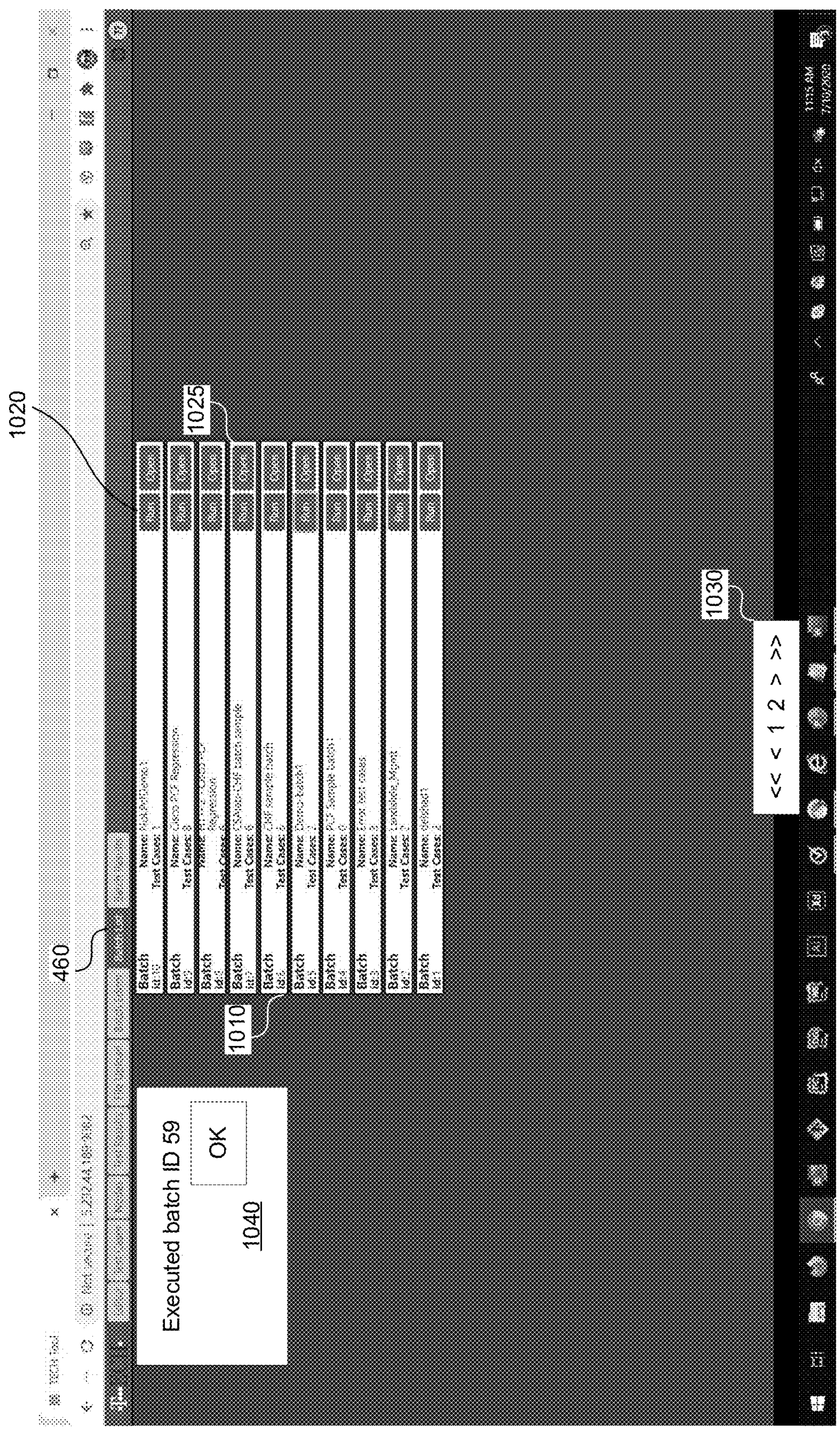
FIG. 10 shows a list of batch jobs.

FIG. 10 shows a list of batch jobs. When button 460 is selected, a processor can provide the list of batch jobs.

Each row 1010 (only one labeled for brevity) represents a single saved batch.

Batch Controls 1020, 1025 enable a user to interact with a saved batch. The Run button 1020 can run a batch. A notification appears with the batch ID. The result of running the batch using the button 1020 can be available on the batch list page. The Open button 1025 enables the user to open the batch in the batch editor. From there, the batch can be run in editor mode, viewed, modified, and cloned.

Page Selector 1030 enables the user to navigate among the pages of batch results. Clicking on the page number of the currently selected page can cause the data on the page to refresh.

When the batch is executed using the run button on the list page, the job ID of the executed batch 1040 will appear in a notification. The Job ID 1040 can be used to look up the batch execution result in the batch result page.

Figure 11:
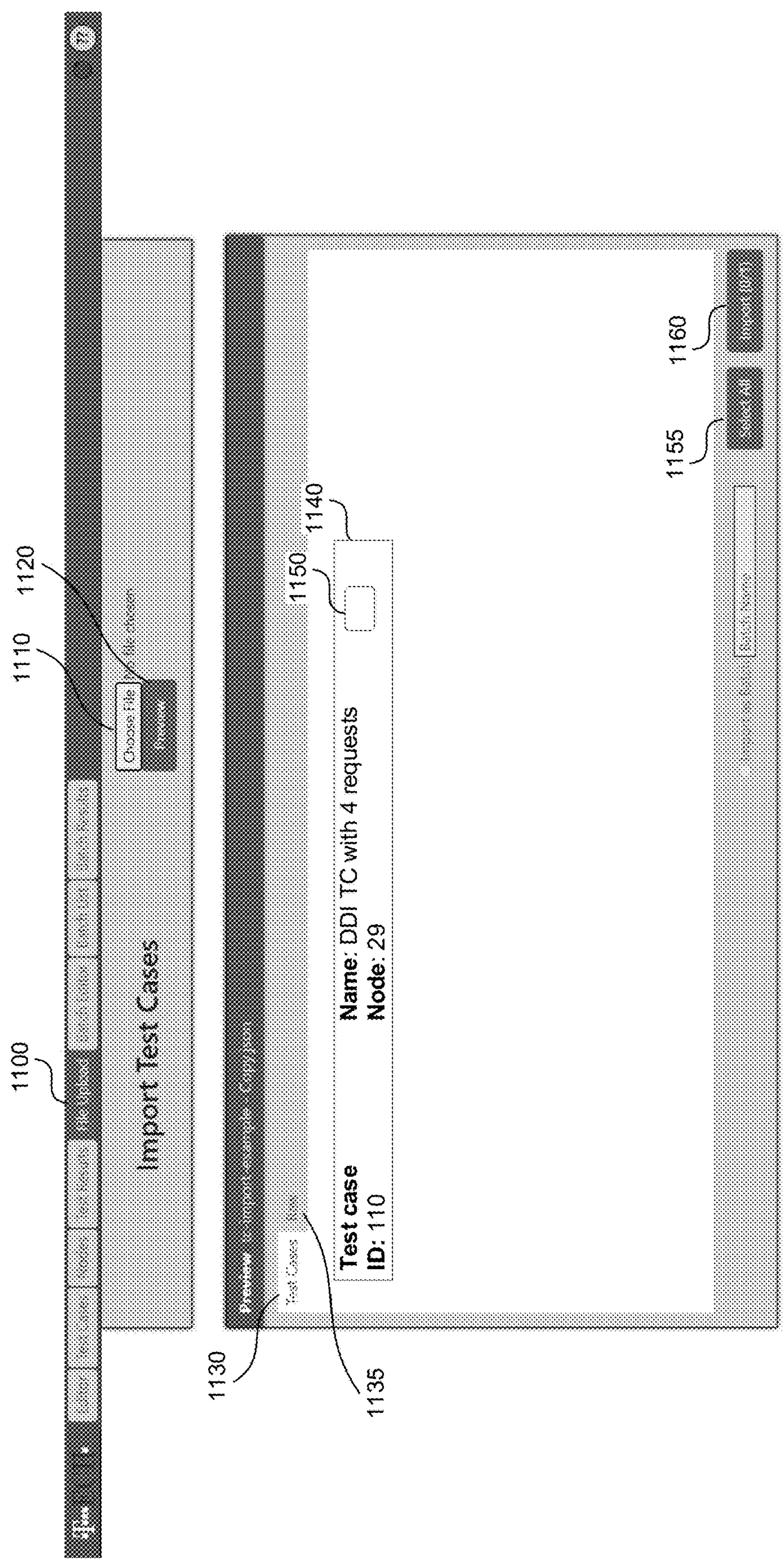
FIG. 11 shows a file upload web page.

FIG. 11 shows a file upload web page. When button 1100 is selected, a processor can enable the user to upload stored files.

Choose File button 1110, when selected, enables a user to select a file containing test cases to import.

Preview button 1120, when selected, enables the user to read the file and preview the test cases it contains.

Tabs 1130, 1135 enable the user to switch between the test cases view and raw view. The view shown in FIG. 11 is the test cases view. The raw view displays the raw contents of the selected file.

Each row 1140 represents one test case that was found in the file. In the example shown in FIG. 11, the file contains only one test case. The color of the background of the row 1140 can indicate the status of the test case. For example, a white background of the row 1140 can indicate no attempt has been made to import the test case yet. A green background of the row 1140 can indicate that the test was successfully imported into the system. A red background of the row 1140 can indicate that an error occurred when importing the given test case.

Button 1150 enables the user to select test cases to import. The Select All button 1155 at the bottom of the page can be used to select all of the test cases in the file. Once the test cases to import have been selected, selection of the Import button 1160 can import the test cases into the system.

When a test case is successfully imported, a number is displayed at a location 1160. This number is the ID of the test case that was just imported. In the test case list, searching for this ID reveals the test case that was imported.

Figure 12:
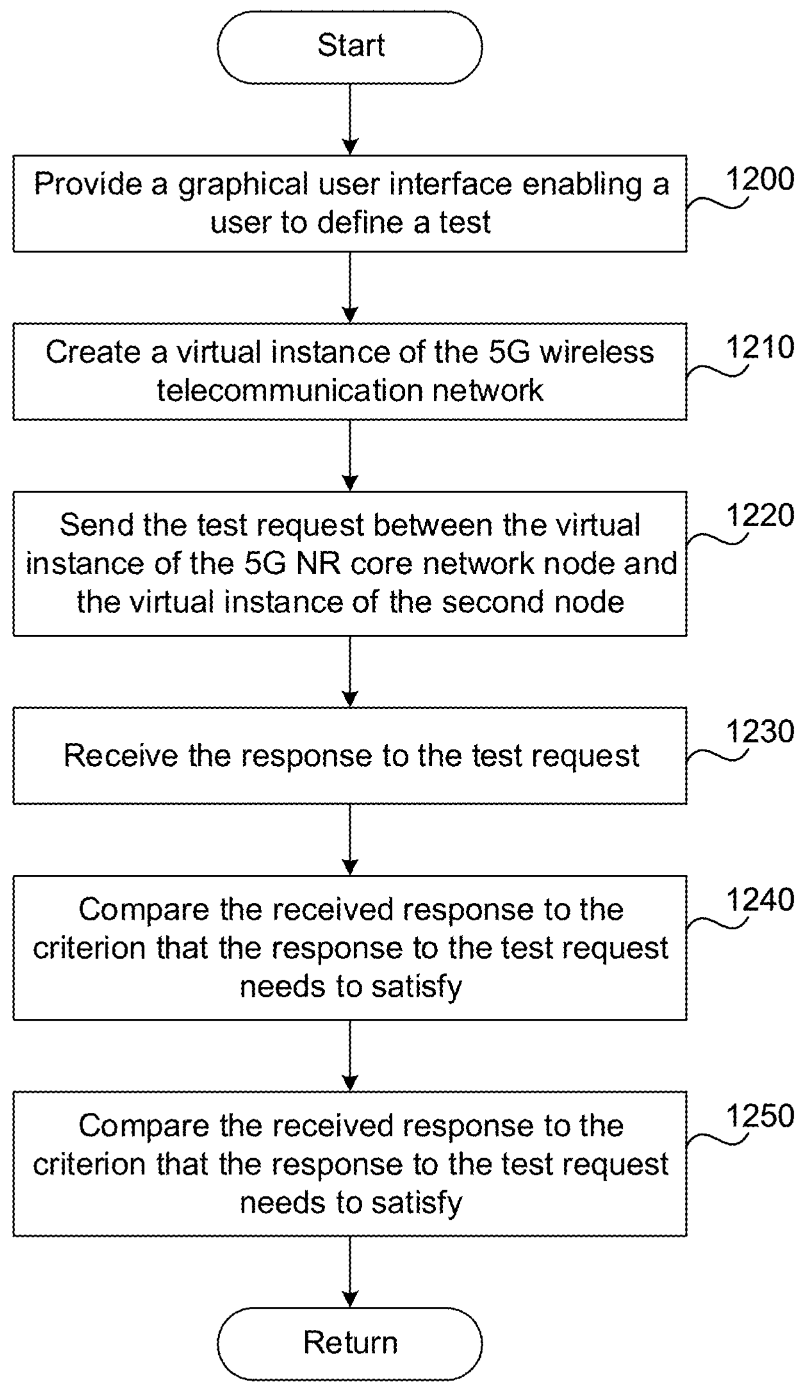
FIG. 12 is a flowchart of a method to simulate operation of a 5G wireless telecommunication network including a 5G New Radio (NR) node.

FIG. 12 is a flowchart of a method to simulate operation of a 5G wireless telecommunication network including a 5G NR node. In step 1200, a processor can provide a graphical user interface enabling a user to define a test including a test request and a criterion that a response to the test request needs to satisfy. The test can be expressed in an HTTP/2 protocol, an HTTPS protocol, or an HTTP 1/1 protocol.

The graphical user interface further can enable the user to specify multiple tests, and group multiple tests into batches, as described herein. The user can also group multiple test requests into a single test case, as described in FIG. 4A. The graphical user interface can enable the user to introduce a time delay between two or more tests.

In step 1210, the processor can create a virtual instance of the 5G wireless telecommunication network including a virtual instance of a 5G NR core network node and a virtual instance of a second node. In step 1220, the processor can send the test request between the virtual instance of the 5G NR core network node and the virtual instance of the second node.

In step 1230, the processor can receive the response to the test request, where the received response includes a message or a determination that the test request is unanswered. In step 1240, the processor can compare the received response to the criterion that the response to the test request needs to satisfy. In step 1250, based on the comparison, the processor can make a determination of whether the 5G NR core network node has passed the test.

The processor can monitor the results of the tests and flag tests that have failed repeatedly, for further investigation. The processor can store, in a database, data regarding the test including the test request, the response to the test request, and the determination of whether the 5G NR core network node has passed the test. Based on the stored data, the processor can identify the most commonly failed tests. The most commonly failed tests can be the majority of the tests that have failed. The processor can send a notification to a system administrator regarding the most common failed tests.

The processor can enable the user to save the test case for later execution. The processor can save the test including the test request and the criterion that the response to the test request needs to satisfy. At a later point in time, the processor can retrieve the saved test and can enable the user to edit the saved test.

The processor can enable the user to upload multiple tests from a file. The processor can receive a selection of a subset of multiple tests. The processor can create a batch including the selection of the subset of multiple tests. The processor can automatically perform each test in the batch.

The processor can enable the user to share the results of the simulation with various other third parties associated with the wireless telecommunication network. For example, the processor can export the test request, the criterion that the response to the test request needs to satisfy, the received response, and the determination whether the 5G NR core network node has passed the test to a file. The processor can share the file with a provider of the 5G NR core network node.

The processor can enable the changing of a simulation parameter while the simulation is running. While the virtual instance of the 5G NR core network node and the virtual instance of the second node are operating, the processor can change a property of the virtual instance of the 5G wireless telecommunication network, by, for example, creating a virtual instance of a third node. The processor can complete a simulation of the virtual instance of the 5G NR core network node, the virtual instance of the second node and the 5G wireless code telecommunication network with the changed property.

Computer

Figure 13:
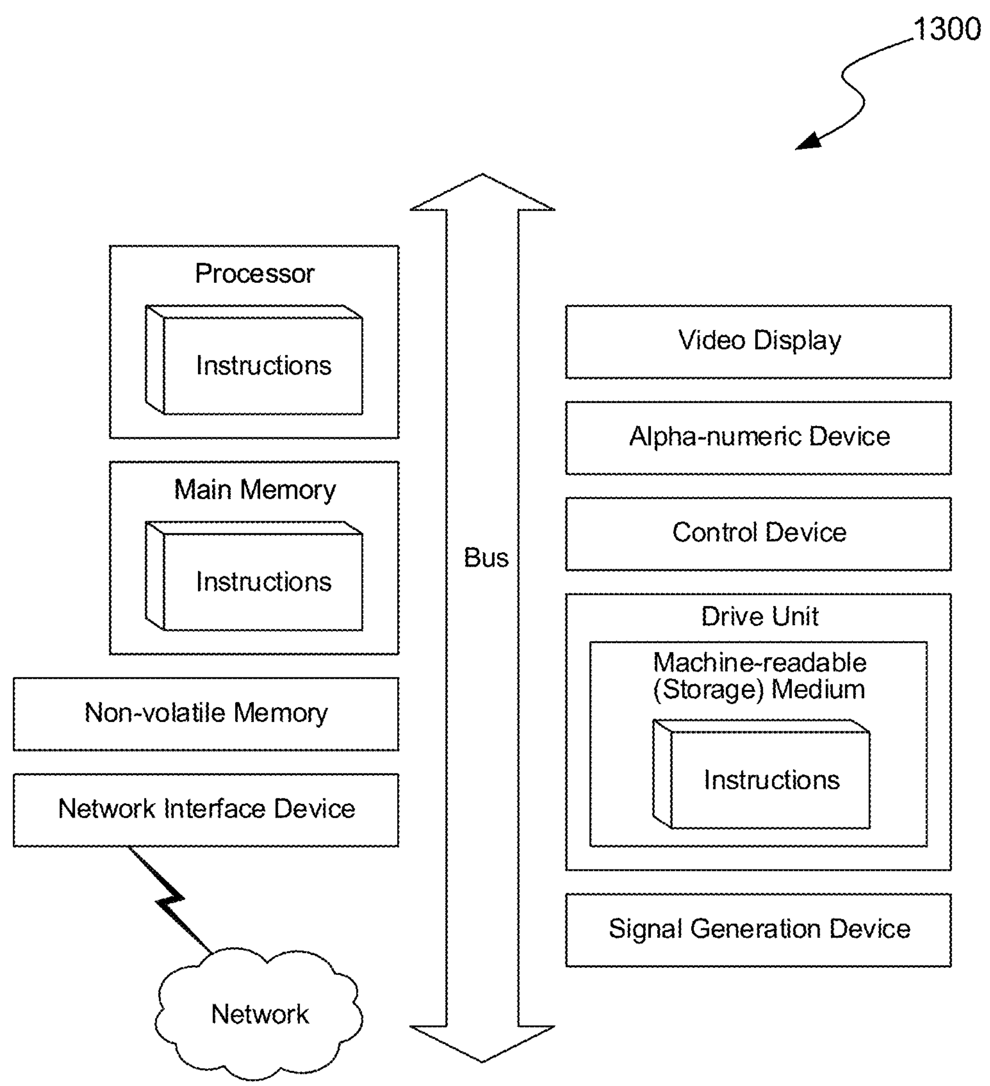
FIG. 13 is a diagrammatic representation of a machine in the example form of a computer system within which a set of instructions, for causing the machine to perform any one or more of the methodologies or modules discussed herein, can be executed.

FIG. 13 is a diagrammatic representation of a machine in the example form of a computer system 1300 within which a set of instructions, for causing the machine to perform any one or more of the methodologies or modules discussed herein, can be executed.

In the example of FIG. 13, the computer system 1300 includes a processor, memory, non-volatile memory, and an interface device. Various common components (e.g., cache memory) are omitted for illustrative simplicity. The computer system 1300 is intended to illustrate a hardware device on which any of the components described in the example of FIGS. 1-12 (and any other components described in this specification) can be implemented. The computer system 1300 can be of any applicable known or convenient type. The components of the computer system 1300 can be coupled together via a bus or through some other known or convenient device.

The processor of the computer system 1300 can implement methods described herein, for example, the method described in FIG. 12. The processor of the computer system 1300 can be associated with the UE 300 in FIG. 3, the cell tower 310 in FIG. 3, and/or the network 100 in FIG. 1. The processor of the computer system 1300 can run the simulation and create virtual instances of nodes 200, 210, 220, 230, 240, 250, 260, 270, 280, 290, 205, 215, 225, 235, 245 in FIG. 2. The process of the computer system 1300 can provide the UI described in FIGS. 4-11. The main memory, the non-volatile memory and/or the drive unit of the computer system 1300 can store the executable instructions described in this application. The network of the computer system 1300 can be the network associated with the UE 300, the cell tower 310 and/or the network 100.

This disclosure contemplates the computer system 1300 taking any suitable physical form. As example and not by way of limitation, computer system 1300 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1300 can include one or more computer systems 1300; be unitary or distributed; span multiple locations; span multiple machines; or reside in a cloud, which can include one or more cloud components in one or more networks. Where appropriate, one or more computer systems 1300 can perform without substantial spatial or temporal limitation one or more steps of one or more methods described or illustrated herein. As an example and not by way of limitation, one or more computer systems 1300 can perform in real time or in batch mode one or more steps of one or more methods described or illustrated herein. One or more computer systems 1300 can perform at different times or at different locations one or more steps of one or more methods described or illustrated herein, where appropriate.

Software is typically stored in the non-volatile memory and/or the drive unit. Indeed, storing an entire large program in memory may not even be possible. Nevertheless, it should be understood that for software to run, if necessary, it is moved to a computer-readable location appropriate for processing, and for illustrative purposes, that location is referred to as the memory in this application. Even when software is moved to the memory for execution, the processor will typically make use of hardware registers to store values associated with the software, and a local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

While the computer-readable medium or computer-readable storage medium is shown in an exemplary embodiment to be a single medium, the term "computer-readable medium" and "computer-readable storage medium" should be taken to include a single medium or multiple media (e.g., a centralized or distributed database, and/or associated caches and servers) that store the one or more sets of instructions. The term "computer-readable medium" and "computer-readable storage medium" shall also be taken to include any medium that is capable of storing, encoding or carrying a set of instructions for execution by the machine and that cause the machine to perform any one or more of the methodologies or modules of the presently disclosed technique and innovation.

In some circumstances, operation of a memory device, such as a change in state from a binary one to a binary zero or vice versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice versa in a memory device can comprise a transformation, such as a physical transformation. Rather, the foregoing are intended as illustrative examples.

A storage medium typically can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, and any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

We claim:

1. At least one computer-readable medium, excluding transitory signals and carrying instructions that, when executed by at least one data processor, performs a method to simulate operation of a 5G wireless telecommunication network including a 5G NR node, the method comprising:

provide a graphical user interface enabling a user to define a test, wherein the test includes a test request and a criterion that a response to the test request needs to satisfy;

create a virtual instance of the 5G wireless telecommunication network including a virtual instance of a 5G NR core network node and a virtual instance of a second node communicatively coupled to the 5G NR network node;

define multiple tests, including multiple test requests, via the graphical user interface;

send the multiple test requests between the virtual instance of the 5G NR core network node and the virtual instance of the second node;

perform the multiple test requests via the virtual instance of the 5G wireless telecommunication network;

receive responses to the multiple test requests, wherein at least one received response includes a determination that at least one of the multiple test requests is unanswered;

cause the responses from the multiple test requests to be stored;

compare each received response to the criterion that the response to the test request needs to satisfy;

based on each comparison, make at least one determination of whether the 5G NR core network node has passed the test;

store data regarding the test including the multiple test requests, the responses to the multiple test requests, and the determination of whether the 5G NR core network node has passed the test;

based on the stored data, identify that at least some of the multiple test requests are similar types of test requests and identify most commonly failed tests requests; and send a notification to a system administrator regarding the most commonly failed test requests, for remedial action.

2. The computer-readable medium of claim 1, the instructions to provide the graphical user interface further comprising the instructions to:

provide the graphical user interface enabling the user to specify the multiple tests and enabling the user to introduce a time delay between two or more tests among the multiple tests.

3. The computer-readable medium of claim 1, wherein at least one test is expressed in an HTTP/2 protocol, an HTTPS protocol, or an HTTP 1/1 protocol, and wherein the determination that the test request is unanswered is provided after a timeout period when no response has been received from the 5G NR network node.

4. The computer-readable medium of claim 1, further comprising the instructions to:

group the multiple test requests into a batch, thereby enabling the multiple test requests to be run at the same time; and display via the graphical user interface an entry that represents result of executing the batch, wherein the entry is expandable and collapsible to display or not test results for the batch.

5. The computer-readable medium of claim 1, further comprising the instructions to:

save at least one test including the test request and the criterion that the response to the test request needs to satisfy;

retrieve the saved test; and edit the saved test to test a different aspect of the 5G wireless telecommunication network.

6. The computer-readable medium of claim 1, further comprising the instructions to:

upload the multiple tests from a file;

receive a selection of a subset of multiple tests;

create a batch including the selection of the subset of multiple tests; and automatically perform each test in the batch.

7. The computer-readable medium of claim 1, further comprising the instructions to:

export each test request, the criterion that the response to the test request needs to satisfy, the received response, and the determination of whether the 5G NR core network node has passed the test to a file; and share the file with a provider of the 5G NR core network node.

8. The computer-readable medium of claim 1, further comprising the instructions to:

while the virtual instance of the 5G NR core network node and the virtual instance of the second node are operating, change a property of the virtual instance of the 5G wireless telecommunication network; and complete a simulation of the virtual instance of the 5G NR core network node, the virtual instance of the second node and the 5G NR wireless telecommunication network with the changed property.

9. At least one computer-readable medium, excluding transitory signals and carrying instructions that, when executed by at least one data processor, performs a method comprising:

provide a graphical user interface enabling a user to define a test, wherein the test includes a test request and a criterion that a response to the test request needs to satisfy;

create a virtual instance of the 5G wireless telecommunication network including a virtual instance of a 5G NR core network node and a virtual instance of a second node;

define multiple tests, including multiple test requests, via the graphical user interface;

send the multiple test requests between the virtual instance of the 5G NR core network node and the virtual instance of the second node;

perform the multiple test requests via the virtual instance of the 5G wireless telecommunication network;

receive responses to the multiple test requests, wherein at least one of the received responses includes a determination that at least one of the multiple test requests is unanswered;

cause the responses from the multiple test requests to be stored;

compare each received response to the criterion that the response to the test request needs to satisfy; and based on the comparison, make at least one determination of whether the 5G NR core network node has passed the test.

10. The computer-readable medium of claim 9, further comprising:

store data regarding the multiple tests including the multiple test requests, the responses to the multiple test requests, and the determination of whether the 5G NR core network node has passed the test;

based on the stored data, identify most common failed tests; and send a notification to a system administrator regarding the most common failed tests.

11. The computer-readable medium of claim 9, further comprising:

while the virtual instance of the 5G NR core network node and the virtual instance of the second node are operating, change a property of the virtual instance of the 5G wireless telecommunication network; and complete a simulation of the virtual instance of the 5G NR core network node, the virtual instance of the second node and the 5G wireless code telecommunication network with the changed property.

12. A system comprising:

one or more processors; and memory coupled to the one or more processors, wherein the memory includes instructions executable by the one or more processors to:

provide a graphical user interface enabling a user to define a test, wherein the test includes a test request and a criterion that a response to the test request needs to satisfy;

create a virtual instance of the 5G wireless telecommunication network including a virtual instance of a 5G NR core network node and a virtual instance of a second node;

define multiple tests, including multiple test requests via the graphical user interface;

send the multiple test requests between the virtual instance of the 5G NR core network node and the virtual instance of the second node;

perform the multiple test requests via the virtual instance of the 5G wireless telecommunication network;

receive responses to the multiple test requests, wherein at least one of the received responses includes a determination that at least one of the multiple test requests is unanswered;

cause the responses from the multiple test requests to be stored;

compare each received response to the criterion that the response to the test request needs to satisfy; and based on the comparison, make at least one determination of whether the 5G NR core network node has passed the test.

13. The system of claim 12, the instructions further comprising the instructions to:

store data regarding the multiple tests including the test requests, the responses to the test requests, and the at least one determination of whether the 5G NR core network node has passed the test;

based on the stored data, identify most common failed tests; and send a notification to a system administrator regarding the most common failed tests.

14. The system of claim 12, the instructions to provide the graphical user interface further comprising the instructions to:

provide the graphical user interface enabling the user to specify multiple tests and enabling the user to introduce a time delay between two or more tests among the multiple tests.

15. The system of claim 12, wherein at least one test is expressed in an HTTP/2 protocol, an HTTPS protocol, or an HTTP 1/1 protocol.

16. The system of claim 12, the instructions further comprising the instructions to:

group the multiple test requests into a single test case.

17. The system of claim 12, the instructions further comprising the instructions to:

upload the multiple tests from a file;

receive a selection of a subset of multiple tests;

create a batch including the selection of the subset of multiple tests; and automatically perform each test in the batch.

18. The system of claim 12, the instructions further comprising the instructions to:

export each test request, the criterion that the response to the test request needs to satisfy, the received response, and the determination of whether the 5G NR core network node has passed the test to a file; and share the file with a provider of the 5G NR core network node.

19. The system of claim 12, the instructions further comprising the instructions to:

while the virtual instance of the 5G NR core network node and the virtual instance of the second node are operating, change a property of the virtual instance of the 5G wireless telecommunication network; and complete a simulation of the virtual instance of the 5G NR core network node, the virtual instance of the second node and the 5G wireless code telecommunication network with the changed property.

20. The system of claim 12, the instructions further comprising the instructions to:

while the virtual instance of the 5G NR core network node and the virtual instance of the second node are operating, change a virtual instance of a third node; and complete a simulation of the virtual instance of the 5G NR core network node, the virtual instance of the second node and the virtual instance of the third node.

* * * * *